United States Patent [19]

Schafer

[11] Patent Number: 4,750,751
[45] Date of Patent: Jun. 14, 1988

[54] PIVOTING AXLE FOR A HILLSIDE COMBINE

[75] Inventor: Scott D. Schafer, Spokane, Wash.

[73] Assignee: Deere & Company, Moline, Ill.

[21] Appl. No.: 935,414

[22] Filed: Nov. 26, 1986

[51] Int. Cl.$^4$ ............................................. B60G 17/00
[52] U.S. Cl. ..................................... 280/6 H; 180/41; 280/6.1; 280/709
[58] Field of Search ............. 280/6 H, 6 R, 6.1, 6.11, 280/104, 709; 180/41

[56] References Cited

U.S. PATENT DOCUMENTS

| | | | |
|---|---|---|---|
| 2,076,523 | 4/1937 | Ballack et al. | 130/27 |
| 3,065,590 | 11/1962 | Knollman | 56/209 |
| 3,160,221 | 12/1964 | Boone | 180/41 |
| 3,703,298 | 11/1972 | Laverda | 280/6 H |
| 3,806,141 | 4/1974 | Janer | 280/688 |
| 4,036,528 | 7/1977 | Langendorf | 280/6 H |
| 4,650,017 | 3/1987 | Pelletier et al. | 280/6 H |

OTHER PUBLICATIONS

Operators Manual 1095521 R2, 2-85, International 1470 Hillside Combine, p. 167.

Primary Examiner—Richard A. Bertsch

[57] ABSTRACT

In the forward undercarriage of a self-propelled hillside combine, all components for support and control of the transverse equalizing or balance beam, are below the floor level of a forward portion of the combine's separator body. In a compact structure which maintains good access to the separator concave and stone trap, and also to the hydraulic cylinders used to control the balance beam, the leveling cylinders diverge widely from a center pivot assembly so as to provide smooth action in control of the balance beam and also to minimize bending moments in the balance beam.

19 Claims, 3 Drawing Sheets

PIVOTING AXLE FOR A HILLSIDE COMBINE

BACKGROUND OF THE INVENTION

The invention concerns a support structure and levelling actuator arrangement for the pivoting main axle of a hillside combine.

The conventional hillside combine is supported by pivoting axles which adjust automatically to the changing slopes of a harvest field, so as to maintain the separator body laterally level. This keeps material distributed evenly across straw walkers and cleaning shoe to maintain efficient separating and cleaning action. Leveling is usually controlled by up and down movement of the front wheels using hydraulic actuators, while the rear axle pivots freely as required. The pivoting transversely extending structural member which either carries the front wheels or is connected to them and controls their movement, corresponds to the front axle of a combine and will be referred to as a balance beam.

In some combines the wheels are connected directly to the ends of the balance beam and maintained upright as the machine adjusts to changing slopes by means of a parallel linkage arrangement. In other machines, each wheel is carried on a large swing arm, each arm being pivoted on the side of the separator body, considerably behind the wheels. In this arrangement, the wheel is in fixed relation to the swing arm and hence maintained upright, and connection to the ends of the balance beam is by a short compensating connecting linkage. The majoral structural element which pivotably connects the balance beam to the separator body will be referred to as a beam box.

In a common hillside combine configuration, exemplified by Knollman and Laverda in U.S. Pat. Nos. 3,065,590 and 3,703,298 respectively, leveling is controlled by a pair of long stroke hydraulic cylinders connected close to the opposite ends of the the balance beam, and extending upright on opposite sides of the separator body, adjacent the operator's station. This upright external position for the leveling cylinders, with cylinder line of action effective close to the opposite ends of the balance beam, is mechanically efficient but no longer feasible on many modern combines. The demand for higher specific capacity within a given overall dimension of vehicle, for more versatile drive and control systems, and for greater convenience, comfort and control in operator stations has preempted this space. (Relatively) wider separator bodies, wider drive wheel tires and more room operator stations leave little room for the "external" cylinder arrangement of Knollman or Laverda.

An alternative balance beam arrangement offered by Boone in U.S. Pat. No. 3,160,221 places the leveling cylinders below the floor of the separator body, with downwardly converging lines of action effective very close to the main pivot of the balance beam. In this position the cylinders are relatively inaccessible. Cylinder specification, including stroke is determined and restricted to a great extent by the limited overall height available, and the balance beam must be designed to accommodate the relatively large bending moments resulting from the relatively long length of balance beam beyond the line of action of the cylinders.

In an axial flow rotary combine, [International Harvester] the leveling cylinder position and orientation is similar to that of Boone, but advantage is taken of the cylindrical shape of the axial flow separator casing within the separator body to extend the cylinders partially up alongside the opposite sides of the cylindrical casing, while the cylinders as a whole remain within the width of the separator body; but cylinder accessibility is still poor and maximum bending moment in the balance beam is still high. A disadvantage of both of the latter arrangements is the relatively coarse and potentially jerky leveling control action. The closeness of the cylinder line of action to the balance beam, means that a small change in cylinder stroke produces a relatively large swing of the balance beam.

Ballack, in U.S. Pat. No. 2,076,523, places the leveling cylinders below and parallel to the balance beam. But Ballack is an arrangement for a pull-type combine and one which is not readily adaptable to the driven wheels of a self-propelled machine.

The hillside combine leveling arrangements referred to above are all solutions to particular machine requirements and space availability, and do not have universal application for converting a level-land combine to a hillside combine.

SUMMARY OF THE INVENTION

Accordingly an object of the invention is to provide a compact self-contained subframe or adapter of minimum overall height, whose general configuration makes it adaptable to almost any self-propelled combine for converting a level-land machine to a hillside combine.

A more particular object is to provide an arrangement in which, in spite of the space restraints imposed by wider separator bodies, wider tires and bulky final drive assemblies, relatively long stroke hydraulic cylinders can be used, and disposed and aligned for smooth and stable function with good mechanical advantage, and in which the cylinders are readily accessible for service, and connected to points spaced on the balance beam so as to minimize bending moments in the beam.

According to one aspect of the invention, a generally transversely extending beam box is mounted under a forward portion of a generally box-like separator body with a generally horizontal interface between the beam box and the underside of the separator body. The beam box includes central upper pivots for the leveling cylinders and a lower central pivot for the balance beam. In a preferred form, the beam box consists of spaced apart rear and front portions, joined by a generally vertically extending columnar web member which supports the front portion of the beam box, cantilever fashion, somewhat ahead of the front face of the separator body. Both the balance beam and the leveling cylinders lie in part within and between the front and rear portions of the beam box, but the shape of the forward portion of the beam box maintains good accessibility to the cylinders which reach out, extending at an acute angle below the horizontal, to intersect and be pivotally connected to the balance beam adjacent its outer ends. In this way a relatively shallow triangular structural truss is defined with the balance beam as its base, the opposite cylinders as its sloping sides and a central vertically extending portion of the beam box between the pivots as a central member of the truss. This arrangement minimizes bending stresses in the balance beam.

The beam box may be the forward structure of a subframe which includes rearwardly extending opposite side members, respectively rigidly connected to the opposite lower sides of the separator body. These subframe side members may provide support for the pivoting of the swing arms for main drive wheels when this wheel arrangement is used.

An advantage of a subframe of this general configuration, connectable entirely on the underside of the separator body of a conventional combine is that it may be interchangeable with the conventional fixed front axle and final drive support structure of a level-land version of the combine. In terms of the attachment interface there is nothing peculiar to the hillside combine. A further advantage is that because the entire balance beam support and control structure is below the floor, or base of the separator body, good access is maintained for example to the concave and stone trap of a conventional combine, and the leveling cylinders are out in the open for good service access.

DESCRIPTION OF THE PREFERRED EMBODIMENT

The invention is embodied in a self-propelled hillside combine which is generally conventional except for the forward undercarriage and subframe of the combine.

Figure 1:
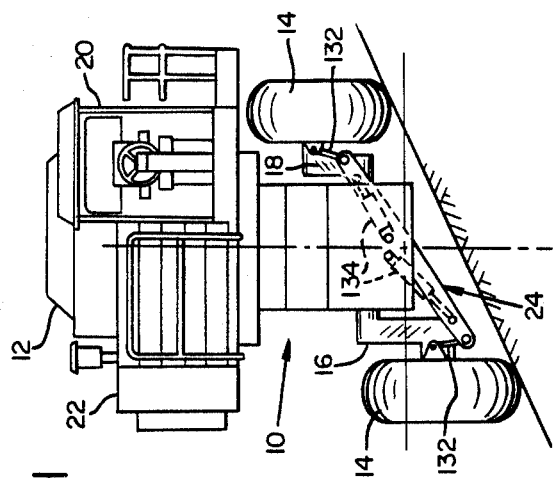
FIG. 1 is a front view of a self-propelled hillside combine harvester embodying the invention and traversing a relatively steep slope. The combine header is omitted for clarity.

In FIG. 1 the harvesting header has been removed exposing more of the separator body 10, which houses conventional threshing cylinder and concave, straw walkers for separation and cleaning shoe for final grain cleaning. Clean grain is delivered to a grain tank 12, only the upper portion of which is seen in the drawing. The combine is supported above the ground on drive wheels 14, and steerable rear wheels [not shown although the pivoting rear axle 15 is shown in phantom outline in FIG. 3]. The wheels 14 are pivotally supported for up and down movement relative to the separator body by rearwardly extending right and left hand swing arms 16 and 18 respectively. The combine is controlled from an operator station 20, and powered by an engine in engine enclosure 22. The wheels 14 are interconnected by a balance beam 24.

Figure 4:
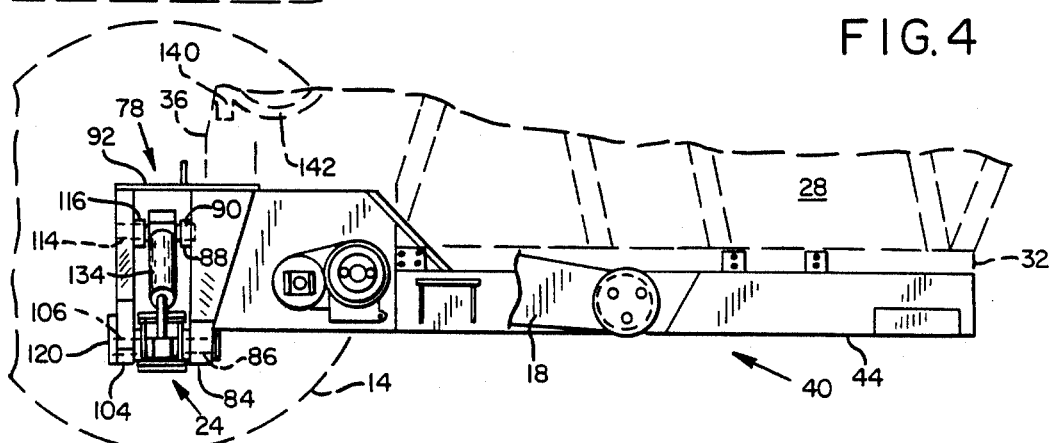
FIG. 4 is a left-hand side view of the undercarriage with the left-hand wheel and swing arm almost completely removed, and the separator body of the combine shown in phantom outline.
Figure 5:
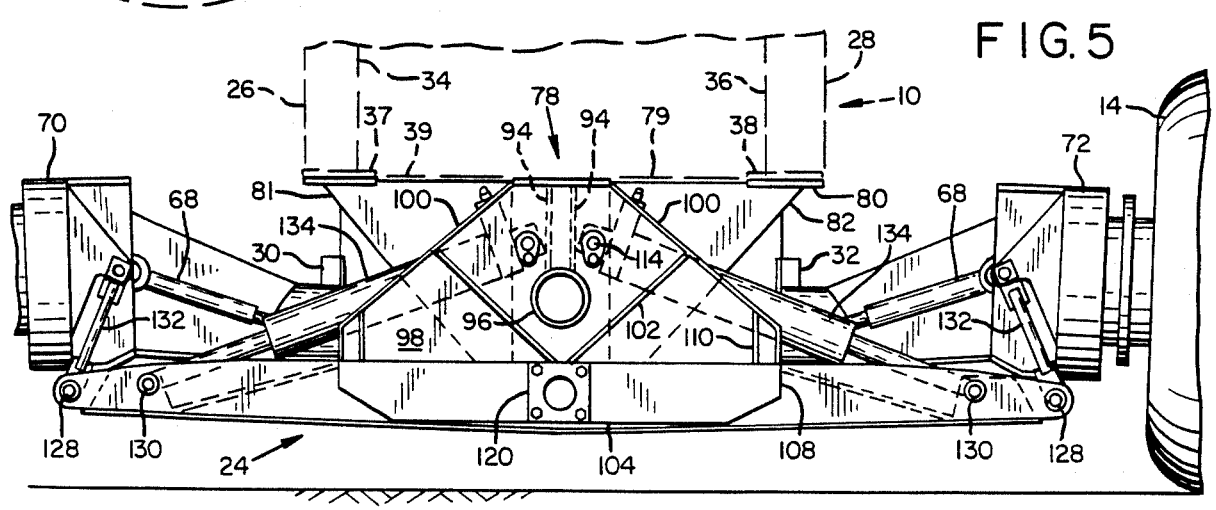
FIG. 5 is a front view of the forward undercarriage of the combine with the separator body indicated in phantom outline.

Portions of the separator body 10 of particular relevance in describing the invention are shown in more detail in FIGS. 4 and 5. The body has opposite right and left-hand side walls 26, 28, respectively, each of which is stiffened by a lower longitudinally extending sill, right and left-hand 30, 32 respectively. The upright front edges of the side walls, 26, 28 are reinforced by right and left-hand front posts 34, 36 respectively forming part of the front wall of the separator body. The posts have mounting pads 37, 38 at their bases which cooperate to define a downwardly facing, transversely extending horizontal support surface 39, offset upwards from the sills 30, 32.

Figure 2:
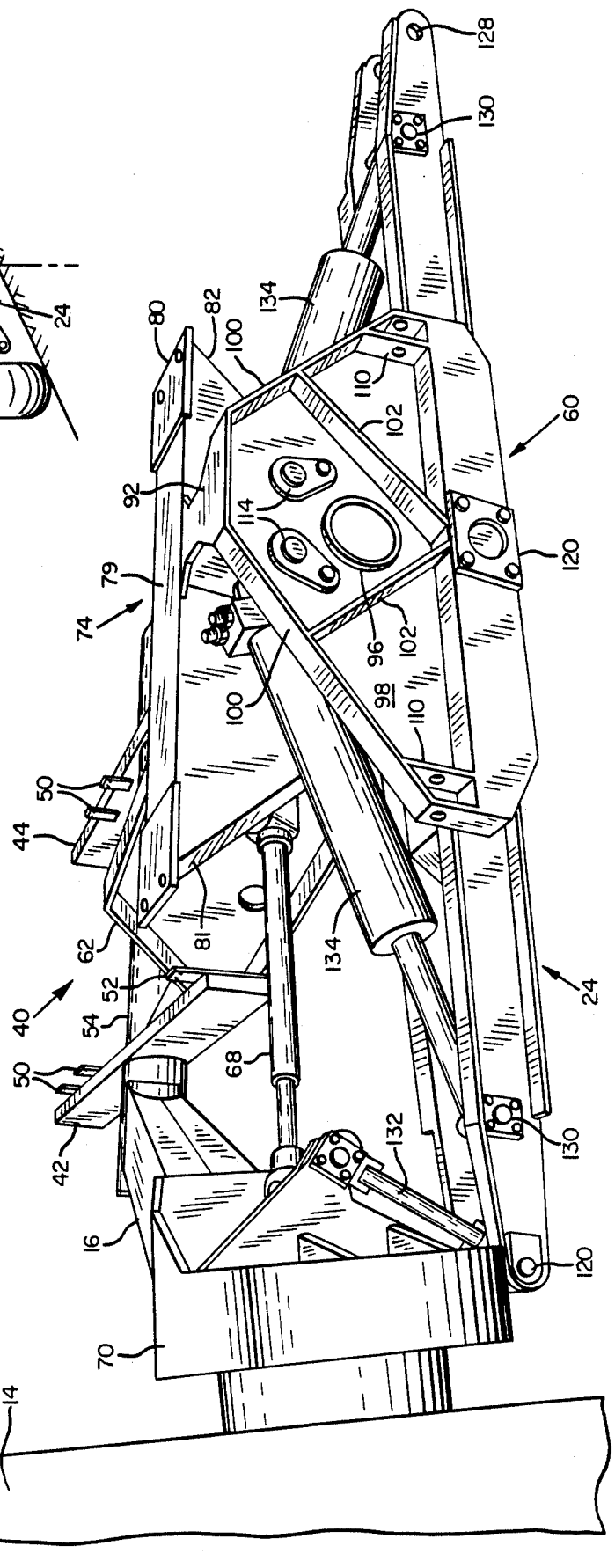
FIG. 2 is an enlarged partial front right three quarters perspective view of the forward undercarriage of the combine, including the structures concerned with supporting and controlling the balance beam and main drive wheels of the combine, with the left hand wheel assembly omitted.
Figure 3:
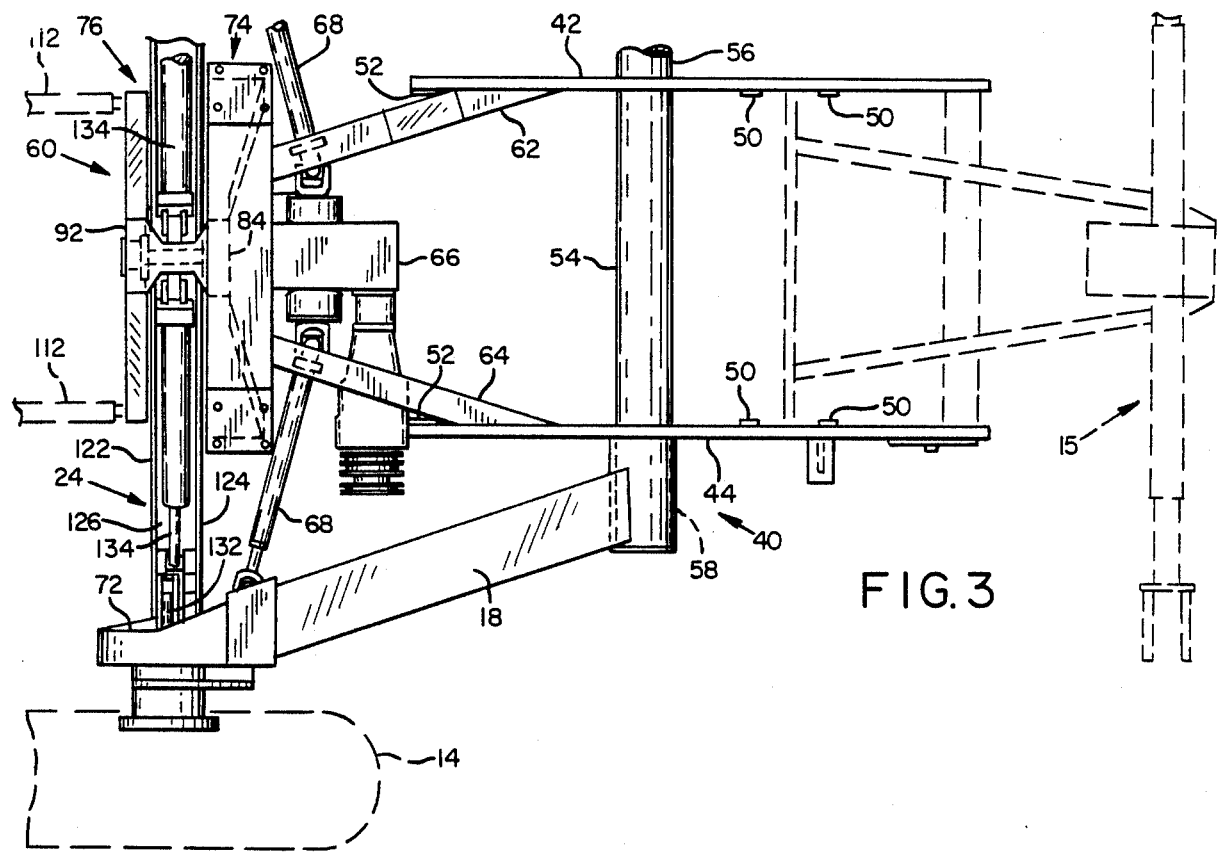
FIG. 3 is an overhead partial view of the forward undercarriage of the combine.

Turning now to the subframe and front undercarriage of the combine, shown almost in its entirety in FIG. 2 and at least partially and in various aspects in FIGS. 3, 4 and 5 also—in the main subframe 40 right and left-hand fore and aft extending side members 42, 44 are spaced so that in assembly they underlie the lower sills 30, 32 of the separator body to which they are secured by connecting lugs 50, 52. A transverse tubular beam 54 ties the side members together and extends through them to provide bearing surfaces 56, 58, for pivoting the main wheel swing arms 16, 18.

The subframe 40 is completed by a forward generally upright beam box assembly 60, which is connected to the side members 42, 44 by a pair of rearwardly diverging brace members 62, 64.

Drive arrangement for the wheels 14 is generally conventional. Hydrostatic transmission 66, supported by the subframe 40, is powered from the engine by a belt drive not shown. Output from the transmission is taken by a pair of universally jointed telescoping drive shafts 68 to right and left-hand final drive assemblies 70, 72 forming part of the swing arms 16, 18.

Looking now at the beam box assembly 60 in more detail—it consists of two transversely extending spaced apart generally triangular structures, a rear or main member 74, generally in the form of an inverted triangle, and a lighter forward member 76, the two portions being spaced and rigidly joined by a columnar web structure 78. The box-like structure of the rear member 74 is closed at its top by a top plate 79, at the opposite ends of which are slightly raised mounting pads 80. Formed right and left-hand body members 81, 82 converge downwards to a short transverse channel member 84, which includes a central pivot socket 86. Somewhat below the top plate 79 and on opposite sides of the dividing web structure 78 is a raised pivot pad 88 providing laterally spaced pivot sockets 90.

The columnar web structure 78 consists of a top connecting plate 92, which is notched into an approximate wine glass shape with the base abutting the top plate 79, and the "bowl" portion extending forward to form a top flange member of the front member 76. The web structure further consists of two vertical plates 94 abutting at their lower ends, a fore and aft extending tubular column 96.

The approximately triangular shape of the front member 76 is largely defined by a plate or web 98, which on its rear side abuts and is rigidly attached as for example by welding to the web structure 78. The plate 98 is reinforced by peripheral stiffeners 100 and internal stiffeners 102, and also by a bottom channel member 104, which embraces a pivot socket 106, registering with the corresponding pivot socket 86 in the rear portion 74. Aligned holes in opposite upright end plates 108 and internal bracket plates 110 provide pivots for header lift cylinders 112, shown in phantom outline only in FIG. 3. Spaced apart leveling cylinder pivot sockets 114 registering with pivot sockets 90 of the rear member 74 are provided in elongated pivot pad 116 so that there is one pivot socket on each side of the pair of vertical plates 94.

The balance beam 24 is pivotably connected to the beam box 60 at pivot sockets 86, 106, by balance beam pivot pin assembly 120. The balance beam 24 is of double girder-like construction, consisting of a front girder member 122, a rear girder member 124 and suitable web members 126, joining the two girder members. Connecting pivot pin sockets 128 are provided at each end of the balance beam and, closely adjacent the ends, are leveling cylinder pivot sockets 130. Universally jointed connecting links 132 connect the balance beam end sockets 128 to the final drive assemblies 70, 72, respectively. A pair of single stage double acting hydraulic cylinders 134 are connected between the beam box upper pivot sockets 90, 114 and the pivot sockets 130 in the balance beam 24. As is clear from the drawings, the angle between the cylinder 134 and balance beam 124 is less than 45°.

In assembling the combine harvester, a forward undercarriage assembly consisting essentially of components as shown in FIGS. 2 through 5 maybe sought under the combine separator body 10, with the beam box attaching pads 80 in register with the feet 37, 38 of the separator body front wall posts 34 and 36, and with the side rails 42, 44 in register with the sill members 30, 32 of the combine body and made fast with suitable fasteners.

Figure 6:
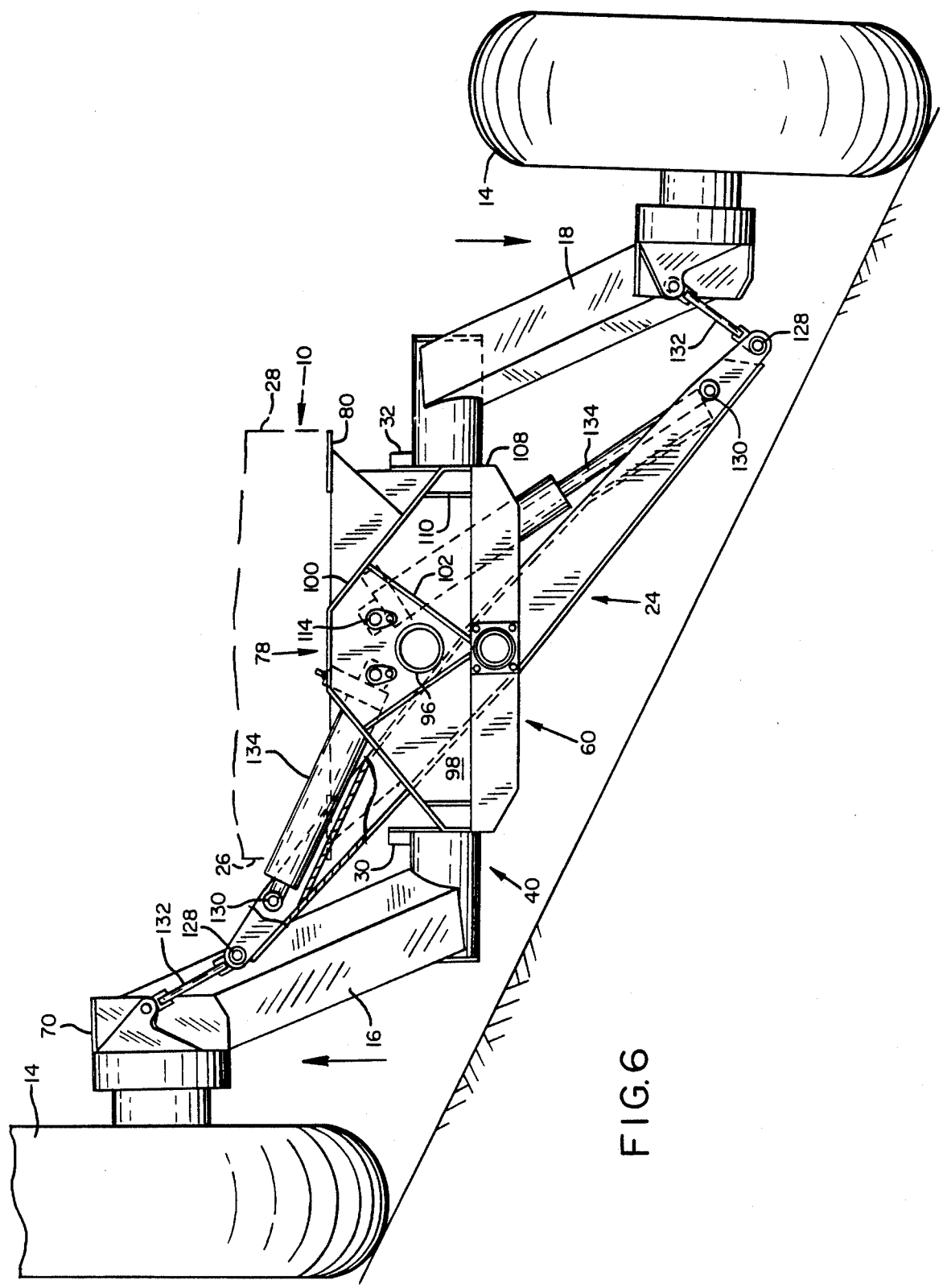
FIG. 6 is an enlarged front view of the forward undercarriage of the combine showing relative disposition of components when the combine is traversing a slope.

In hillside operation the undercarriage assembly may assume a configuration such as that shown in FIG. 6. A level sensing device in the combine body has signaled the leveling cylinders 134 to extend and retract appropriately, pivoting the balance beam 24 so that through its connection by connecting links 132 with the swing arms 16 and 18, the wheels 14 are relatively raised and lowered so as to maintain the combine separator body 10 upright. The wheels, carried by swing arms 16 and 18, and pivoting on the journals 56, 58, also remain in an upright position parallel to the separator body.

As shown in FIG. 6, which shows the undercarriage configuration when the combine is on a fairly steep slope, the advantageous arrangement of the levelling cylinders 134 requires that they be free to swing above the horizontal. The cantilevered forward extension of the beam box front portion 76 positions the cylinders so that they are free to do this, swinging in front of the separator body 10.

As is shown, particularly in FIGS. 4 and 5, a beam box 60 according to the invention is very compact in terms of overall height with no portion of the structure extending above the "floor line" of the front of the separator, thus maintaining good access to the stone trap 140 and concave 142 of the conventional combine, indicated in outline in FIG. 4. The leveling cylinders 134 and balance beam 24 are pivoted on pins in double shear between the front and rear portions 76, 74 of the beam box assembly 60, to ensure stability of the pivots, but even so, because of the shape and configuration of the beam box assembly, including the forward cantilevering of the front portion 76, the leveling cylinders 134 are readily accessible for service, and assembly or removal.

The relatively shallow triangular truss form consisting of the balance beam 24 between the pivots 130, the leveling cylinders 134 and a "central strut" provided by the structure of the beam box 60, establish an efficient structure for transferring loads between the separator body 10 and the wheels 14. The small amount of balance beam overhang between the leveling cylinder pivots 130 and the connecting link pivots 128 minimizes the maximum bending moment in the beam [at pivots 130]. The wide spread of the relatively long stroke cylinders 134 helps in providing smooth leveling action in response to sensed changes in slope.

I claim:

1. In a hillside combine having a separator body, including a forward portion with a downwardly facing generally horizontal, support surface and a transversely extending balance beam carried below the forward portion of the body, the beam including opposite lateral ends and a central pivot means defining a fore and aft extending pivot axis distant from the beam ends, and the combine including a pair of opposite left and right-hand drive wheels flanking the body and supported for vertical movement in respective upright planes relative to the body and adjacent the respective balance beam lateral ends, and means for pivotably connecting the wheels to the balance beam respective lateral ends, means for connecting the balance beam to the body and controlling its movement relative to the body comprising:

a beam box rigidly attached to and depending from the downwardly facing support surface of the separator body and including spaced apart transversely extending front and rear portions, and upper actuator pivot means and lower balance beam pivot means defining respectively vertically spaced fore and aft extending pivot axes, the upper actuator pivot means being disposed below the separator downwardly facing support surface;

means for connecting the balance beam central pivot means to the beam box balance beam pivot means for pivoting the balance beam about a fore and aft axis in a transverse plane relative to the body;

a pair of actuator pivot means included in the balance beam, one on each side of and remote from the central pivot means; and a pair of linear actuators, one each connected respectively between the upper actuator pivot means of the beam box and the beam actuator pivot means, the respective actuator pivot means being disposed so that, when connected, the linear actuators and the balance beam together cooperate to define a broad based relatively shallow triangle and the linear actuators being operable to change length so as to pivot the balance beam about its central pivot axis so as to raise and lower the wheels relative to the body.

2. The invention of claim 1 wherein the linear actuators extend, at least in part, between the front and rear portions of the beam box.

3. The invention of claim 1 wherein the beam box is connected to the separator body only by the rear portion of the beam box.

4. The invention of claim 3 wherein the front portion of the beam box is entirely supported by the rear portion of the beam box.

5. The invention of claim 1 wherein, in assembly, the balance beam pivot axis lies within a fore and aft vertically extending plane approximately bisecting the separator body and wherein the rear portion of the beam box tapers downwardly to embrace the lower balance beam pivot means.

6. The invention of claim 1 wherein the front portion of the beam box is approximately in the form of an upright triangle.

7. The invention of claim 6 wherein the balance beam pivot means of the beam box is adjacent the base of said triangle.

8. The invention of claim 6 wherein the front portion of the beam box further includes forwardly directed pivot bracket means for receiving header lift cylinders.

9. The invention of claim 1 wherein the balance beam further includes outer wheel connecting pivot means adjacent the beam ends.

10. The invention of claim 1 wherein, in assembly, the linear actuators each extend downwardly and outwardly at an angle of less than 45 degrees to the balance beam.

11. The invention of claim 1 wherein the front and rear beam box portions are connected only by a columnar structure spaced upwards from the balance beam pivot means.

12. The invention of claim 11 wherein the upper actuator pivot means of the beam box comprises two pivot sockets, one on each side of the columnar structure.

13. A balance beam arrangement for a hillside combine, the combine having a separator body with a forwardly disposed, transversely extending, downwardly facing support surface extending beneath a threshing cylinder and concave and being supported above ground by a plurality of wheels, including a pair of front wheels for bearing at least a part of the separator load comprising:
   a beam box with a transversely extending rear portion having a generally horizontal top for engaging the support surface of the separator body and a transversely extending front portion spaced from the rear portion, and a columnar structure rigidly connecting the front and rear portions and, below the rear portion top horizontal surface, central upper actuator pivot means and lower balance beam pivot means, each disposed in both portions and registering one with the other;
   a balance beam having a central pivot means pivotably carried by the lower balance beam pivot means and extending transversely between the portions of the beam box and having outer ends connectable with the wheels and adjacent each of said ends, an actuator pivot means; and
   a pair of linear actuators connected between the respective actuator pivot means of the beam box and of the balance beam so that the balance beam, actuators and beam box cooperate to form a structural truss of which the upper actuator pivot means is the apex.

14. In a hillside combine having a separator body with a front wall and a forwardly disposed generally horizontal, downwardly facing support surface adjacent the front wall and a plurality of subframe attaching points in a lower portion of the body rearward of the support surface, a forward undercarriage comprising:
   a rear subframe portion including generally longitudinally extending side members and a swing arm pivot means establishing a transverse horizontal pivot axis, and means for connecting the subframe to the subframe attaching points of the separator body;
   a forward subframe portion rigidly attached to the rear subframe portion and including a beam box having a generally transverse horizontal top surface for engaging and being rigidly connected to the separator body support surface, and including upper and lower pivot means with fore and aft axes disposed below the top surface;
   a transversely extending balance beam having a central pivot means, pivotably supported at said means by the lower pivot means of the beam box for rocking in a transverse upright plane and having opposite ends, and a pair of actuator pivot means, one each adjacent an end of the beam;
   a pair of linear actuators, one each connected between the respective upper pivot means of the beam box and the actuator pivot means of the balance beam, said actuators being operable to rock the beam about the central pivot means;
   a pair of opposite swing arms for pivotably mounting, one each on the swing arm pivot means of the rear subframe, each swing arm normally extending forward to adjacent the balance beam ends and carrying a ground engaging drive wheel adjacent its forward end; and
   means for connecting the respective swing arms adjacent their forward ends to the balance beams opposite ends, the actuators being operable to extend and retract so as to rock the balance beam and so to oscillate the swing arms so that the wheels move up and down relative to the body.

15. The undercarriage of claim 14 wherein the beam box comprises a transversely extending rear portion, including the transverse horizontal top surface and a transversely extending forward portion spaced from the rear portion and a columnar structure connected between said portions and supporting the forward portion cantilever fashion.

16. The undercarriage of claim 15 wherein the upper pivot means includes two laterally spaced pivot sockets, one on each side of the columnar structure.

17. The undercarriage of claim 15 wherein the balance beam and the linear actuators all extend generally transversely between the front and rear portions of the beam box.

18. The undercarriage of claim 14 wherein the transverse support surface of the separator body is closely adjacent the front wall of the body and wherein a significant portion of the beam box extends forwardly of the front wall.

19. The undercarriage of claim 14 wherein the upper and lower pivot means of the beam box are vertically spaced and disposed in an upright plane which includes the fore and aft extending longitudinal center line of the separator body.

* * * * *